March 19, 1963

R. MONELLI ET AL 3,082,387

MULTI-CONDUCTOR TELECOMMUNICATION CABLES FOR AUDIO AND CARRIER FREQUENCIES

Filed July 23, 1959

Riccardo Monelli and
Bruno Bortoletto
INVENTORS
by Eugene E. Stevens
ATTORNEY

United States Patent Office 3,082,387

Patented Mar. 19, 1963

3,082,387

MULTI-CONDUCTOR TELECOMMUNICATION CABLES FOR AUDIO AND CARRIER FREQUENCIES

Riccardo Monelli, Milan, and Bruno Bortoletto, Naples, Italy, assignors to Pirelli Societa per Azioni, Milan, Italy, a corporation of Italy Filed July 23, 1959, Ser. No. 829,109
2 Claims. (Cl. 333—96)

The present invention relates to multi-conductor telecommunication cables which permit the transmission of telephone messages both at audio frequencies and at carrier frequencies, the main object being to increase the range of frequencies which can be efficiently transmitted.

The coaxial type lines employed in the telecommunications art are substantially immune to radio-frequency disturbances since the tubular outer conductor also acts as a screen in relation to the space enclosed by it. It is known, however, that this screening effect is reduced according as the frequency of the disturbing signal decreases, for which reason it is not advisable to transmit on coaxial lines signals of too low a frequency, for which symmetrical lines are much more suitable. For example, in coaxial land cables for multiplex telephony at carrier frequencies, the minimum frequency usually employed is 60 kc./s. in Europe and 68 kc./s. in the United States of America, while in submarine coaxial cables this frequency can be as low as 20 kc./s., but it is the usual practice to protect the cable from interference by providing it with a lead sheath near the points where it reaches land and in the terminal land sections. The impossibility of utilising a lower part of the frequency spectrum naturally leads to a reduction of the number of telephone channels transmissible. It also follows that it is not possible to utilise the coaxial line for audio-frequency transmission, but only for carrier-frequency systems.

Symmetrical star-quad lines, on the other hand, have so to speak opposite characteristics, in the sense that they permit the use of three circuits, namely the two side circuits plus the phantom circuit, this being possible both at audio frequencies and up to frequencies of the order of 60 kc./s., owing to their symmetry towards earth, as a result of which, if the balancing is perfect, any external disturbance induces on the wires forming the telephone circuits equal voltages of opposite sign, the resultant of which is zero.

At frequencies over 60 kc./s., on the other hand, there occurs mutual interference (so-called cross-talk) between the side circuits and the phantom circuit, which acquires a level such as to render the use of this latter circuit problematical, even if the cable is constituted by a single star quad. If, therefore, the cable contains a plurality of star quads, the effect of interference is increased and it is advisable to abandon the use of the phantom circuits above the audio-frequency spectrum and utilise only the side circuits for carrier-frequency systems, which may reach 240 kc./s. in cables having a paper insulation and 552 kc./s. in those insulated with polystyrene insulating materials.

To summarise, while coaxial cables transmit without difficulty signals having frequencies of several megacycles, they are not suitable for utilising the initial portion of the frequency spectrum because of external interference. On the other hand, star quads provide three circuits both at audio frequencies and at carrier frequencies for a moderate number of channels whilst, at higher frequencies, at which phantom circuits are unusable, they provide two circuits which can be used up to the frequencies above specified, but not beyond, because of the interference due to the cross-talk between the various circuits contained in the same cable.

This difference of behaviour of the two types of lines above considered reflects on the construction and, therefore, on the cost of land telephone cables. In fact, when planning, for example, a link by coaxial cable with a large number of channels between two important terminal stations, it is advisable to provide at the same time a suitable number of channels for local connections between the various smaller centres through which the main trunk passes. On the basis of what has been illustrated above, these connections cannot be provided on the same coaxial pairs carrying the traffic between the terminal stations, nor is it advisable, if the number of channels required is small, to provide them on other coaxial pairs contained in the same cable. On the contrary, in general, it is advisable to provide a composite cable, that is, one containing, in addition to a certain number of coaxial pairs, also a suitable number of star quads, which naturally results in a cable of large dimensions and which is therefore most costly.

Moreover, in the special case of connections made by means of submarine lines, it generaly happens that the number of circuits required is initially very small and that a gradual increase at later dates is anticipated. Under these conditions, the solution of employing a coaxial cable in the first instance must be rejected, since, even for the production of a single circuit, it requires the adoption of complex equipment the full potentialities of which would not be exploited, whereas the solution of employing a cable having a single star quad immediately furnishes, without any costly equipment, the three audio-frequency circuits and provides the possibility of installing carrier-frequency systems as increases in the traffic manifest themselves. However, in that case for equal maximum frequency and equal attenuation, the star-quad system requires a cable of larger size than the coaxial system and therefore entails greater cost for the installation.

The present invention has for its object to provide a new type of cable specially adapted for multiplex telephone connections in land or submarine cables and which is constructed in such manner that it can be used in the same manner as a conventional coaxial cable when transmitting the frequencies normally used on such cables, e.g. above 60 kc./s. and as a star quad below this frequency, thus combining in itself the advantages of the two types of line described above and permitting, all other conditions being equal, the obtainment of a greater number of circuits.

According to the invention a multi-conductor telecommunication cable for audio- and carrier-frequency transmission comprises at least one group of five conductors, namely, a central conductor and four outer conductors, arranged symmetrically around the central conductor to form collectively a tube (divided, however, into four distinct sectors), all of the said conductors being individually and mutually insulated by a mass of insulating material in which they are embedded and which surrounds them externally to form an insulating sheath, so that the cable may be used for high frequencies as a coaxial pair with the tube as the outer conductor, and for lower frequencies as a symmetrical star quad. The outer conductors may be in the form, for example, of precurved metal strips, e.g., copper, disposed symmetrically, though spaced apart, around the central conductor to form the tube coaxial with said central conductor.

If the outer conducting elements are not in the form of curved strips of conductive material, they may be composed of small bunches of wires disposed side by side.

The four outer or peripheral conducting elements, however formed, are fixed in position by an overlying sheath of thermoplastic material which penetrates into the gaps separating them, thus forming a single whole with the insulation of the central conductor.

External to the sheath, the cable is completed in the most suitable manner, according to the purpose for which the cable is used, by means of electrostatic or electromagnetic screens.

The method of cable construction according to this invention comprises the steps of covering by extrusion the central conductor with the thermoplastic insulating material to a diameter greater than the required internal diameter of the tube defined by the outer conductors, heating the surface of said thermoplastic material and applying the spaced outer conductors, previously heated, to the heated surface by passing them and the insulated central conductor together through a die to embed the outer conductors in the softened surface of the insulation and to cause flow of the displaced insulation into the gaps between the conductors. The external insulating sheath is then extruded over the whole.

Alternatively the method may comprise the steps of covering by extrusion the central conductor with a mass of thermoplastic insulating material to a diameter substantially equal to the required internal diameter of the tube defined by the outer conductors, winding the said outer conductors helically in mutually spaced relationship, together with intervening filling strips of insulation, around the insulated central conductor, winding helically over the said assembly of conductors and fillings a taping of thermoplastic insulating material for holding the assembly in place and finally causing the said taping to melt to form a whole with the mass of insulation and the fillings by extruding over the whole the outer sheath of insulating material.

The central conductor may be, for example, a single wire or strand of copper and this is insulated to the desired diameter by extruding a thermoplastic dielectric material, for example polyethylene, so as to obtain a cylindrical core. Against this core of circular cross-section there are rested the arcuate conducting elements concentric with the central conductor, each of such elements subtending an angle of less than 90°. These conducting elements form as a whole the return conductor of the coaxial pair and at the same time form a symmetrical star-type quad. The conductors are anchored in position by the external sheath of thermoplastic insulation and the cable may be screened.

The cable may be combined with others in a single cable. In order to avoid contact between screens which may be on the various individual cables, each of the latter may be insulated, for example, by a thin tape made, for instance, of paper or polyethylene terephthalate, wound helically with overlapping edges.

Examples of cables according to the invention will now be described in more detail with reference to the accompanying drawings, in which.

Figure 1:
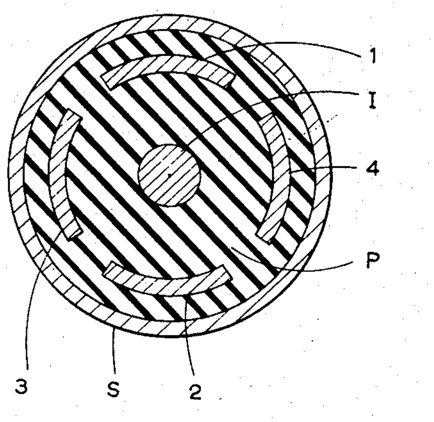
FIGURE 1 is a diagrammatic cross-section of a cable comprising a set of five conductors constructed according to the present invention.

In FIGURE 1, I represents a central conductor, and the references 1, 2, 3, 4 denote four peripheral conductors arranged in a circle concentrically around the central conductor. P is the homogeneous mass of thermoplastic material insulating the five conductors from one another and externally and S is a surrounding electromagnetic screen.

Figure 2:
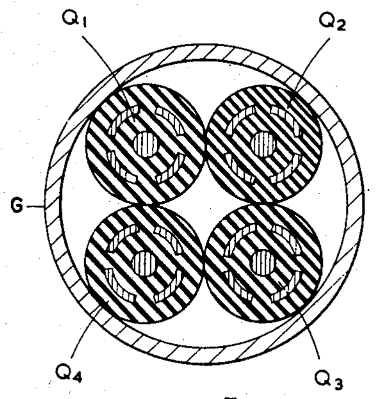
FIGURE 2 is a diagrammatic cross-section of a land cable containing four five-conductor cables constructed according to the scheme shown in FIGURE 1.

When the cable is used on a coaxial circuit, I is the central conductor of the coaxial pair and the conductors 1, 2, 3 and 4 collectively form the return conductor of the coaxial pair. The conductors 1, 2, 3 and 4 also form a symmetrical star quad. FIGURE 2 shows diagrammatically a cross-section of a cable containing, within a sheath G, four quintuple cables Q1, Q2, Q3, Q4, constructed according to the scheme shown in FIGURE 1 and provided with a wrapping of insulating tape over each of the screens.

Figure 3:
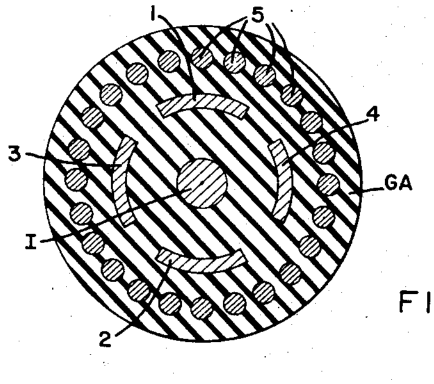
FIGURE 3 is a diagrammatic cross-section of a submarine cable containing a single set of five conductors according to the invention.

FIGURE 3 shows diagrammatically a cross-section of a submarine cable provided with an armoured antitorsional sheath GA comprising parallel strands 5 and which contains a single quintuple arrangement of conductors I, 1, 2, 3, 4 similar to that shown in FIG. 1 but not provided with any external wrapping of tape.

In order that the four peripheral conductors may be used as a quad, the following two conditions must be satisfied:

(*a*) Each peripheral conductor must be perfectly insulated, throughout the length of the cable, with respect to the two conductors adjacent to it and with respect to the surrounding medium;

(*b*) Perfect geometrical and electrical symmetry must be ensured for the purpose of reducing couplings between the circuits obtainable in the quad to the minimum.

In order to comply with said conditions, the present invention provides a method of cable construction different from that in which conventional coaxial cables are constructed.

In one known construction used in coaxial pairs for telephony over land cables, the outer conductor is formed by a single copper tape applied longitudinally and having its opposite edges bent towards each other to form a tube which is supported internally by the continuous or discontinuous insulation applied to the central conductor, the tube being also wrapped externally in helically wound steel tapes. In coaxial pairs of submarine cables, the outer conductor is generally formed by six or eight strips disposed in a helix at a suitable pitch on the insulation surrounding the central conductor, these strips being maintained in position by a copper or brass tape wound over them at a much shorter pitch. Although the development of the strips is obviously less than the length of the circumference of the insulation on which they rest, no steps are taken to avoid contact between the strips which, moreover, are also short-circuited by the overlying tape.

In the present invention, compliance with the said conditions *a* and *b* is ensured by leaving a gap between the four peripheral conductors in the cross-section, filling this gap with the same dielectric material as that insulating the central conductor and insulating said peripheral conductors wtih respect to each other and externally by means of a further layer of dielectric in the form of a sheath.

As regards the actual steps in the method of construction, the insulated set of conductors with the outer insulating sheath can be obtained in several ways, some of which, among those most simply carried into effect, are given hereunder:

*Method 1.*—The hot strips of metal 1 ,2, 3 and 4 are applied to the already insulated central conductor I after the surface of the insulation has been heated and a suitable die forces them into the softened outer surface of the insulation, causing them to sink into said surface and at the same time making the insulation itself flow again into the interspaces between the strips in the form of ribs which, on solidifying, keep the four strips insulated and spaced in the desired manner. This method can be carried into effect either arranging the strips parallel, or winding them in a helix. The insulating sheath is then extruded over the strips which have been anchored in this way.

*Method 2.*—In a first step, the strips 1, 2, 3 and 4 are stranded helically on the already insulated central conductor I together with four fillings of thermoplastic material disposed in the interspaces, the whole being kept in place by a tape wound helically with a short pitch, this being also of thermoplastic material. In a second step, a sheath of thermoplastic material is extruded over the assembly and in this operation both the fillings and the tape are melted, thus forming a single mass which unites the outer sheath with the insulation of the central conductor and keeping the four strips insulated from one another.

*Method 3.*—Where submarine cables are concerned, Methods 1 and 2 may be followed, apart from any particular process, by providing the cable with an anti-torsional armoured sheath, and also by making the quintuple cable completely anti-torsional, provided that care is taken to observe geometrical symmetry between the four strips.

By way of example, the following dimensions may be observed, in full keeping with current practice in connection with land cables intended for multiple telephone connections.

For each quintuple unit contained in the cable, a single central copper wire 1.20 mm. in diameter is insulated with expanded polyethylene (cellular polyethylene) up to a diameter of 4.5 mm.; then four copper strips 2.7 mm. in width and 0.2 mm. thick, are precurved and disposed symmetrically on the insulating cylinder so as to leave a gap of about 1 mm. between one strip and the next; over the strips there is applied a sheath having a thickness of 0.5 mm., also made of expanded polyethylene, which penetrates between the strips and embeds them in a cylinder of circular cross-section having an external diameter of 5.5 mm.; over the latter there are then applied in the form of a helix two mild steel tapes 11 mm. wide and 0.05 mm. thick.

The following can be considered as a suitable example of a quintuple cable for submarine connections: A single central copper wire 4.29 mm. in diameter is insulated in polyethylene up to a diameter of 15.75 mm.; four precurved copper strips 0.4 mm. thick are applied resting with their inner surface on the circumference of the diameter of 15.75 mm., of which they cover arcs which are equal and such as to leave free an arc of 2 mm. between each strip and the adjacent ones. The strips are stranded at a pitch of about 300 mm., if the cable is intended to be protected by an armouring of conventional type, or are preferably disposed parallel if the cable is intended to be protected by an anti-torsional armoured sheath. In each case, the polyethylene sheath is applied over the strips to a diameter of about 24 mm., so that the effective capacities of the various circuits may assume suitable values below 100 mμf./km.

Figure 4:
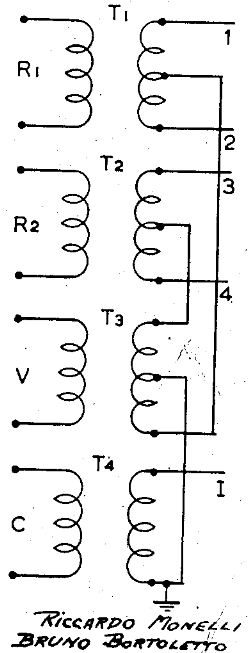
FIGURE 4 is a diagram of one mode of making the terminal connections of the five conductor cable according to the invention.

No special difficulties arise as regards the separation of the various circuits which can be obtained with the quintuple cable forming the subject of the present invention, it being sufficient, for example, to employ four transformers. In FIGURE 4, the transformers T1 and T2 feed the two side circuits R1 and R2, while to their centres there leads the transformer T3 of the phantom circuit V, the centre of which is connected to the earthed end of the transformer T4 feeding the central conductor I of the coaxial circuit C.

It is further to be noted that a cable containing a plurality of five-conductor cables complying with the requirements of the present invention permits the use of the same frequency band for the two directions of transmission, both on coaxial circuits and on symmetrical circuits, inasmuch as, since it is possible to provide each five-conductor cable with an electromagnetic screen, a high degree of attenuation of near-end cross-talk between the circuits of different cables is obtained.

What we claim and desire to secure by Letters Patent of the United States is:

1. A multi-conductor telecommunication system including in combination at least one cable means composed of five conductors, namely, a central conductor and four outer conductors arranged symmetrically around the central conductor to form collectively a tube whereby the latter is divided into four distinct sectors, all of the said conductors being individually and mutually insulated by a mass of insulating material in which they are embedded and which surrounds them externally to form an insulating sheath, a source of frequency above 60 kc./s., a load operable by said frequency, said source being connected to said load through the central conductor and the tube in said cable means, a source of frequency below 60 kc./s. and a load operable by said lower frequency, said lower frequency source being simultaneously connected to said load through the four outer conductors in said cable means used as a symmetrical star quad.

2. A multi-conductor telecommunication system, including in combination at least one cable means composed of five conductors, namely, a central conductor and four outer conductors arranged symmetrically around the central conductor to form collectively a tube, whereby the latter is divided into four distinct sectors, all of the said conductors being individually and mutually insulated by a mass of insulating material in which they are embedded and which surrounds them externally to form an insulating sheath, two signal sources operating at a frequency below 60 kc./s., two transformers having the primary windings respectively connected with the said two signal sources and the secondary windings connected with the four outer conductors in said cable means used as a symmetrical star quad, two loads respectively operable by said signals, a signal source operating at a frequency above 60 kc./s., a transformer having the primary winding connected to said signal source and the secondary winding connected to the said central conductor and to the four outer conductors and a load operable by said last-mentioned signal source.

References Cited in the file of this patent

UNITED STATES PATENTS

| | | |
|---|---|---|
| 801,130 | Barclay | Oct. 3, 1905 |
| 2,583,167 | Corbino | Jan. 22, 1952 |
| 2,754,351 | Horn | July 10, 1956 |
| 2,810,669 | Heupgen | Oct. 22, 1957 |

FOREIGN PATENTS

| | | |
|---|---|---|
| 22,923 | Great Britain | 1892 |
| 424,920 | Great Britain | Mar. 4, 1935 |
| 783,064 | Great Britain | Sept. 18, 1957 |
| 714,544 | Germany | Dec. 1, 1941 |